United States Patent
Jotoku et al.

(10) Patent No.: US 10,556,298 B2
(45) Date of Patent: Feb. 11, 2020

(54) WELDED JOINT AND METHOD OF MANUFACTURING WELDED JOINT

(71) Applicant: NIPPON STEEL & SUMITOMO METAL CORPORATION, Tokyo (JP)

(72) Inventors: Kana Jotoku, Amagasaki (JP); Hiroyuki Hirata, Neyagawa (JP); Tomohiko Omura, Kishiwada (JP); Jun Nakamura, Nishinomiya (JP); Takahiro Osuki, Takarazuka (JP)

(73) Assignee: NIPPON STEEL CORPORATION, Tokyo (JP)

( * ) Notice: Subject to any disclaimer, the term of this patent is extended or adjusted under 35 U.S.C. 154(b) by 483 days.

(21) Appl. No.: 15/117,467

(22) PCT Filed: Feb. 20, 2015

(86) PCT No.: PCT/JP2015/054722
§ 371 (c)(1),
(2) Date: Aug. 9, 2016

(87) PCT Pub. No.: WO2015/129561
PCT Pub. Date: Sep. 3, 2015

(65) Prior Publication Data
US 2016/0354870 A1 Dec. 8, 2016

(30) Foreign Application Priority Data
Feb. 26, 2014 (JP) .................. 2014-035376

(51) Int. Cl.
*B23K 35/30* (2006.01)
*C22C 38/58* (2006.01)
*C22C 38/00* (2006.01)
*C22C 38/02* (2006.01)
*C22C 38/06* (2006.01)
*C22C 38/44* (2006.01)
*C22C 38/46* (2006.01)
*C22C 38/48* (2006.01)
*B23K 101/10* (2006.01)
*B23K 103/04* (2006.01)

(52) U.S. Cl.
CPC ...... *B23K 35/3066* (2013.01); *B23K 35/3086* (2013.01); *C22C 38/001* (2013.01); *C22C 38/002* (2013.01); *C22C 38/02* (2013.01); *C22C 38/06* (2013.01); *C22C 38/44* (2013.01); *C22C 38/46* (2013.01); *C22C 38/48* (2013.01); *C22C 38/58* (2013.01); *B23K 2101/10* (2018.08); *B23K 2103/04* (2018.08)

(58) Field of Classification Search
CPC ........ B23K 2103/04; B23K 9/23; C22C 38/46
USPC ................................. 148/325; 420/8
See application file for complete search history.

(56) References Cited

U.S. PATENT DOCUMENTS

| 3,740,525 | A | | 6/1973 | Baumel | |
|---|---|---|---|---|---|
| 9,211,601 | B2 | * | 12/2015 | Hirata | B23K 35/3086 |
| 2002/0148533 | A1 | * | 10/2002 | Kim | B23K 35/3086 148/24 |

FOREIGN PATENT DOCUMENTS

| DE | 1960025 | 6/1971 |
|---|---|---|
| JP | 04-75783 | 3/1992 |
| JP | 05-192785 | 8/1993 |
| JP | 2010-227949 | 10/2010 |
| JP | 2014-008515 | 1/2014 |
| WO | 2004/083476 | 9/2004 |
| WO | 2004/083477 | 9/2004 |
| WO | 2004/110695 | 12/2004 |
| WO | 2013/005570 | 1/2013 |
| WO | WO-2013005570 A1 * | 1/2013 ......... B23K 35/3086 |

* cited by examiner

*Primary Examiner* — Jie Yang
(74) *Attorney, Agent, or Firm* — Clark & Brody

(57) ABSTRACT

A welded joint having high strength and good hydrogen embrittlement resistance is provided. A welded joint is a welded joint obtained by welding a base material using a welding material. The base material has a chemical composition of, in mass %: C: 0.005 to 0.1%; Si: up to 1.2%; Mn: 2.5 to 6.5%; Ni: 8 to 15%; Cr: 19 to 25%; Mo: 0.01 to 4.5%; V: 0.01 to 0.5%; Nb: 0.01 to 0.5% Al: less than 0.05%; N: 0.15 to 0.45%; O: up to 0.02%; P: up to 0.05%; and S: up to 0.04%, and a balance being iron and impurities, and which satisfies Equation (1). The welding material has a chemical composition which satisfies Equations (1) and (2).

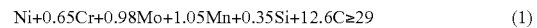

Ni+0.65Cr+0.98Mo+1.05Mn+0.35Si+12.6C≥29    (1)

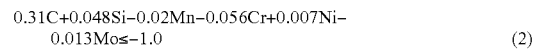

0.31C+0.048Si−0.02Mn−0.056Cr+0.007Ni−0.013Mo≤−1.0    (2)

5 Claims, No Drawings

WELDED JOINT AND METHOD OF MANUFACTURING WELDED JOINT

TECHNICAL FIELD

The present invention relates to a welded joint and a method of manufacturing a welded joint, and more particularly to an austenitic-steel welded joint and a method of manufacturing an austenitic-steel welded joint.

BACKGROUND ART

In recent years, research has been done to commercialize transport machines that use hydrogen, natural gas or the like as its driving energy. Such commercialization requires establishment of a utilization environment where such gases under high pressure can be stored and transported. At the same times, high-strength materials used in these applications that have tensile strengths higher than 800 MPa have been developed and their applications have been considered. WO 2004/083476, WO 2004/083477 and WO 2004/110695 propose increasing Mn to increase the solubility of N and including V or including a combination of V and Nb to take advantage of solute strengthening of N and precipitation strengthening of nitride to provide an austenitic stainless steel with increased strength.

When a high-strength austenitic steel is used as a structure, parts made therefrom must be welded together. To provide sufficient performance in use, the welded portion is required to have a strength substantially equal to that of the base material. WO 2004/110695, JP Hei5(1993)-192785 and JP 2010-227949 propose actively utilizing Al, Ti and Nb to provide a welding material and weld metal having a tensile strength exceeding 800 MPa.

These welding materials and weld metals provided by using these welding materials must be subjected to heat treatment after welding in order to provide high strength. A prolonged heat treatment after welding means a limitation in manufacturing and may cause an increase in manufacturing costs.

WO 2013/005570 proposes taking advantage of solute strengthening of welded metal by N to provide an austenitic-steel welded joint having high strength and good hydrogen embrittlement resistance without performing heat treatment after welding.

DISCLOSURE OF THE INVENTION

In making the austenitic-steel welded joint of WO 2013/005570, a welding material containing 0.15 to 0.35% N is used for welding to cause the weld metal to contain 0.15 to 0.35% N. Because of that, welding materials are limited to be used for this austenitic-steel welded joint. This austenitic-steel welded joint requires the use of a welding material containing a large amount of N and thus cannot be efficiently produced, and, under some welding conditions, may have weld defects such as blowholes.

Further, even when a welding material containing a large amount of N is used, N may be separated from the weld metal during welding. To take advantage of solute strengthening by N, N must remain in the weld metal. As long as a conventional welded joint is to be produced, it is difficult to provide a certain N content in the weld metal in a stable manner under a wide range of welding conditions.

Further, a welded joint to be used in handling high-pressure hydrogen is required to have good hydrogen embrittlement resistance.

An object of the present invention is to provide a welded joint having high strength and good hydrogen embrittlement resistance.

A welded joint according to the present invention is a welded joint obtained by welding a base material using a welding material. The base material has a chemical composition of, in mass %: C: 0.005 to 0.1%; Si: up to 1.2%; Mn: 2.5 to 6.5%; Ni: 8 to 15%; Cr: 19 to 25%; Mo: 0.01 to 4.5%; V: 0.01 to 0.5%; Nb: 0.01 to 0.5%; Al: less than 0.05%; N: 0.15 to 0.45%; O: up to 0.02%; P: up to 0.05%; and S: up to 0.04%, and a balance being iron and impurities. The welding material has a chemical composition of, in mass %: C: 0.005 to 0.1%; Si: up to 0.7%; Mn: 0.5 to 3%; Ni: 8 to 23%; Cr: 17 to 25%; Mo: 0.01 to 4%; V: 0 to 0.5%; Nb: 0 to 0.5%; Al: less than 0.05%; N: less than 0.15%; O: up to 0.02% P: up to 0.03%; and S: up to 0.02%, and a balance being iron and impurities. The chemical composition of the base material satisfies Equation (1). The chemical composition of the welding material satisfies Equations (1) and (2).

$$\text{Ni}+0.65\text{Cr}+0.98\text{Mo}+1.05\text{Mn}+0.35\text{Si}+12.6\text{C} \geq 29 \quad (1)$$

$$0.31\text{C}+0.048\text{Si}-0.02\text{Mn}-0.056\text{Cr}+0.007\text{Ni}-0.013\text{Mo} \leq -1.0 \quad (2)$$

Here, the contents of elements (in mass %) are substituted for the symbols of these elements in Equations (3) and (2).

The present invention provides a welded joint having high strength and good hydrogen embrittlement resistance.

EMBODIMENTS FOR CARRYING OUT THE INVENTION

The present inventors did research to find conditions under which a welded joint can be provided having high strength and good hydrogen embrittlement resistance without performing heat treatment after welding and without using a welding material containing a large amount of N. They found out the following points (a) to (c).

(a) When the austenitic phase of the weld metal is unstable, its weld residual strain and the subsequent treatment transform the austenitic phase in the weld metal into martensite. This decreases the hydrogen embrittlement resistance of the weld metal. In view of this, adjusting the chemical composition of the weld metal to stabilize the austenitic phase will improve the hydrogen embrittlement resistance of the weld metal. More specifically, the weld metal suitably satisfies Equation (1) below. The chemical composition of the weld metal satisfies Equation (1) if the chemical compositions of both the base material and welding material satisfy Equation (1).

$$\text{Ni}+0.65\text{Cr}+0.98\text{Mo}+1.05\text{Mn}+0.35\text{Si}+12.6\text{C} \geq 29 \quad (1)$$

Here, the contents of elements (in mass %) are substituted for the symbols of these elements in Equation (1).

(b) To provide a welded joint having a strength substantially equal to that of the base material, it is effective to dissolve a large amount of N in the weld metal for solute strengthening by N. This is achieved if the chemical composition of the welding material satisfies Equation (2). If the chemical composition of the welding material satisfies Equation (2), it is possible to dissolve a large amount of N in the weld metal even if the N content in the welding material is lower than 0.15 mass %.

$$0.31\text{C}+0.048\text{Si}-0.02\text{Mn}-0.056\text{Cr}+0.007\text{Ni}-0.013\text{Mo} \leq -1.0 \quad (2)$$

Here, the contents of elements (in mass %) are substituted for the symbols of these elements in Equation (2).

(c) A still higher tensile strength can be achieved if the height of excess weld metal formed on the outer surface of the welded joint (i.e. surface excess weld metal height) is adjusted depending on the chemical composition of the welding material. More specifically, the surface excess weld metal height h (mm) suitably satisfies Equation (3).

$$1.9 \times (0.31C + 0.048Si - 0.02Mn - 0.056Cr + 0.007Ni - 0.013Mo) + 3 \leq h \quad (3)$$

Here, the contents of the elements in the welding material (in mass %) are substituted for the symbols of these elements in Equation (3).

The welded joint of the present invention was made based on the above findings. The welded joint in an embodiment of the present invention will be described below in detail. In the description below, "%" for the content of an element means mass percentage.

The welded joint in the present embodiment is obtained by welding a base material with a welding material. The welded joint includes a base material and a weld metal. The weld metal is formed by a part of the base material and the welding material melting together and solidifying. The welded joint may be, for example, steel pipes or steel plates with their adjacent ends/edges welded together.

[Chemical Composition]

The base material and welding material include the chemical composition as described below.

C: 0.005 to 0.1% (Base Material and Welding Material)

Carbon (C) stabilizes austenite. On the other hand, if an excessive amount of C is contained, heat during welding may cause carbide along grain boundaries, which decreases corrosion resistance and toughness. In view of this, for both the base material and welding material, the C content should be in the range from 0.005 to 0.1%. The preferable lower limit of the C content is 0.008%. The preferable upper limit of the C content is 0.08%.

Si: Up to 1.2% (Base Material), Up to 0.7% (Welding Material)

Silicon (Si) deoxidize steel. Si also improves the corrosion resistance of steel. However, if an excessive amount of Si is contained, the toughness of the steel decreases. In view of this, the Si content in the base material should be up to 1.2%. The preferable upper limit of the Si content in the base material is 1.0%.

In addition, if an excessive amount of Si is contained in a weld metal formed by the welding material melting, Si segregates along columnar crystal boundaries when solidifying, which decreases the melting point of the liquid phase, increasing solidification crack sensitivity. In view of this, the upper limit of the Si content in the welding material should be lower than that for the base material. Thus, the Si content in the welding material should be up to 0.7%. The preferable upper limit of the Si content in the welding material is 0.6%. No lower limit is needed for the Si content; however, an excessively low amount may result in insufficient deoxidization, which increases the index of cleanliness of the steel and deteriorates the cleanliness, increasing costs. Thus, the desirable lower limit of Si is 0.01% for both the base material and welding material.

Mn: 2.5 to 6.5% (Base Material), 0.5 to 3% (Welding Material)

Manganese (Mn) deoxidizes steel. Mn also stabilizes an austenitic phase. Mn further increases the solubility of N in the weld metal during production of the base material and during welding, thereby indirectly contributing to increasing the strength of the weld metal. On the other hand, if an excessive amount of Mn is contained, the ductility of the steel decreases. In view of this, the Mn content in the base material should be in the range from 2.5 to 6.5%. The preferable lower limit of the Mn content in the base material is 2.7%. The preferable upper limit of the Mn content in the base material is 6%.

The solidification rate for a weld metal formed by the welding material melting is higher than that for the base material being produced, and thus the reduction in N during solidification is smaller. In view of this, the lower limit of the Mn content in the welding material may be lower than that for the base material. On the other hand, in the case of the welding material, a reduction in ductility may make it difficult to produce fine wires therefrom. In view of this, the upper limit of the Mn content in the welding material should be lower than that for the base material. Thus, the Mn content in the welding material should be in the range from 0.5 to 3%. The preferable lower limit of the Mn content in the welding material is 0.7%. The preferable upper limit of the Mn content in the welding material is 2.5%.

Ni: 8 to 15% (Base Material), 8 to 23% (Welding Material)

Nickel (Ni) stabilizes an austenitic phase. To achieve this effect in a stable manner, 8% or more Ni must be contained. However, an excessive amount of Ni decreases the solubility of N in the weld metal during production of the base material. Further, since Ni is an expensive element, an excessive content means increased costs. In view of this, the upper limit of the Ni content in the base material should be 15%. Further, the preferable lower limit of the Ni content in the base material is 9%. The preferable upper limit of the Ni content in the base material is 14.5%.

In the weld metal, too, Ni stabilizes the austenitic phase. To achieve this effect in a stable manner, 8% or more Ni must be contained in the welding material. However, an excessive content of Ni decreases the solubility of N in the weld metal. Further, since Ni is an expensive element, an excessive content means increased costs even for welding materials in petty manufacturing. In view of this, the upper limit of Ni in the welding material should be 23%. The preferable lower limit of the Ni content in the welding material is 9%. The preferable upper limit of the Ni content in the welding material is 22.5%.

Cr: 19 to 25% (Base Material), 17 to 25% (Welding Material)

Chromium (Cr) increases the corrosion resistance of steel. Cr further increases the solubility of N in the weld metal during production of the base material and during welding, thereby indirectly contributing to increasing the strength of the weld metal. On the other hand, if an excessive amount of Cr is contained, a large amount of coarse particles of a carbide such as $M_{23}C_6$ which decreases ductility and toughness may be produced. Further, if an excessive amount of Cr is contained, the steel may be made brittle in some types of weld gas environment. In view of this, the Cr content in the base material should be in the range from 19 to 25%. The preferable lower limit of the Cr content in the base material is 19.2%. The preferable upper limit of the Cr content in the base material is 24.5%.

The solidification rate for a weld metal formed by the welding material melting is higher than that for the base material being produced, and thus the reduction in N during solidification is smaller. In view of this, the lower limit of the Cr content in the welding material may be lower than that for the base material. Thus, the Cr content in the welding material should be in the range from 17 to 25%. The preferable lower limit of the Cr content in the welding material is 18.2%. The preferable upper limit of the Cr content in the welding material is 24.5%.

Mo: 0.01 to 4.5% (Base Material), 0.01 to 4% (Welding Material)

Molybdenum (Mo) dissolves in a matrix or precipitates in the form of a carbonitride, increasing the strength of the steel. Mo also increases the corrosion resistance of the steel. On the other hand, if an excessive amount of Mo is contained, this increases costs. Also, when an excessive amount of Mo is added to the steel, the steel is saturated in terms of Mo's effects. In view of this, the Mo content in the base material should be in the range from 0.01 to 4.5%. The preferable lower limit of the Mo content in the base material is 0.03%. The preferable upper limit of the Mo content in the base material is 4%.

The solidification rate for a weld metal formed by the welding material melting is higher than that for the base material being produced, and thus the reduction in N during solidification is smaller. In view of this, the upper limit of the Mo content in the welding material should be lower than that for the base material. Thus, the Mo content in the welding material should be in the range from 0.01 to 4%. The preferable lower limit of the Mo content in the welding material is 0.03%. The preferable upper limit of the Mo content in the welding material is 3.8%.

V: 0.01 to 0.5% (Base Material), 0 to 0.5% (Welding Material)

Vanadium (V) dissolves in a matrix or precipitates in the form of a carbide, increasing the strength of the steel. On the other hand, if an excessive amount of V is contained, a large amount of carbide precipitates, decreasing the ductility of the steel. In view of this, the V content in the base material should be in the range from 0.01 to 0.5%. The preferable upper limit of the V content in the base material is 0.4%.

Vanadium (V) does not need to be added to the welding material. That is, V is an optional element for the welding material. If the welding material contains V, this increases the strength of the weld metal. In view of this, the V content in the welding material should be in the range from 0 to 0.5%. If V is added, the preferable lower limit of the V content in the welding material is 0.01%. The preferable upper limit of the V content in the welding material is 0.4%.

Nb: 0.01 to 0.5% (Base Material), 0 to 0.5% (Welding Material)

Niobium (Nb) dissolves in a matrix or precipitates in the form of a carbonitride, increasing the strength of the steel. On the other hand, if an excessive amount of Nb is contained, a large amount of carbonitride precipitates, decreasing the ductility of the steel. In view of this, the Nb content in the base material should be in the range from 0.01 to 0.5%. The preferable upper limit of the Nb content in the base material is 0.4%.

Niobium (Nb) does not need to be added to the welding material. That is, Nb is an optional element for the welding material. If the welding material contains Nb, this increases the strength of the weld metal. In view of this, the Nb content in the welding material should be in the range from 0 to 0.5%. If Nb is added, the preferable lower limit of the Nb content in the welding material is 0.01%. The preferable upper limit of the Nb content in the welding material is 0.4%.

Al: Less than 0.05% (Base Material and Welding Material)

Aluminum (Al) deoxidizes steel. On the other hand, if an excessive amount of Al is contained, a large amount of nitride precipitates, decreasing the ductility of the steel. In view of this, for both the base material and welding material, the Al content should be less than 0.05%. The preferable upper limit of the Al content is 0.04%. The lower the Al content, the better. However, an excessively low amount of Al results in insufficient deoxidization. Further, an excessively low amount of Al increases the index of cleanliness of the steel. Further, an excessively low amount of Al means increased costs. In view of this, the preferable lower limit of the Al content is 0.0001%.

N: 0.15 to 0.45% (Base Material), Less than 0.15 (Welding Material)

N dissolves in a matrix or forms fine nitride particles, increasing the strength of the steel. On the other hand, if an excessive amount of N is contained, the hot workability of the steel decreases. In view of this, the N content in the base material should be in the range from 0.15 to 0.45%. The preferable lower limit of the N content in the base material is 0.16%. The preferable upper limit of the N content in the base material is 0.42%.

In a weld metal formed by the welding material, melting, an excessive amount of N cannot melt in the molten pool during welding, which may result in blowholes and/or pits. In view of this, the N content in the welding material should be less than 0.15%. The preferable lower limit of the N content in the welding material is 0.01%. The preferable upper limit of the N content in the welding material is 0.13%.

The balance in the chemical composition of each of the base material and weld metal is Fe and impurities. Impurity means an element originating from ore or scraps used as the raw material of steel or an element that has entered for various reasons during the manufacturing process. In the present embodiment, the contents of the impurities O, P and S are limited to the ranges described below.

O: 0.02% (Base Material and Welding Material)

Oxygen (O) is an impurity. If an excessive amount of O is contained, hot workability during production of the base material and welding material decreases. Further, if an excessive amount of O is contained, the toughness and ductility of the weld metal decreases. In view of this, for both the base material and welding material, the O content should be up to 0.02%. The preferable upper limit of the O content is 0.01%.

P: Up to 0.05% (Base Material), Up to 0.03% (Welding Material)

Phosphorus (P) is an impurity. If an excessive amount of P is contained, hot workability during production of the base material and welding material decreases. In view of this, the P content in the base material should be up to 0.05%. The preferable upper limit of the P content in the base material is 0.03%.

In a weld metal formed by the welding material melting, P decreases the melting point of the liquid phase when solidifying, increasing the solidification crack sensitivity of the weld metal. In view of this, the upper limit of the P content in the welding material should be lower than that for the base material. Thus, the P content in the welding material is up to 0.03%. The preferable upper limit of the P content in the welding material is 0.02%.

S: Up to 0.04% (Base Material), 0.02% (Welding Material)

Sulfur (S) is an impurity. If an excessive amount of S is contained, hot workability during production of the base material and welding material decreases. In view of this, the S content in the base material should be up to 0.04%. The preferable upper limit of the S content in the base material is 0.03%.

In a weld metal formed by the welding material melting, S decreases the melting point of the liquid phase when solidifying, increasing the solidification crack sensitivity of the weld metal. In view of this, the upper limit of the S content in the welding material should be lower than that for the base material. Thus, the S content in the welding material should be up to 0.02%. The preferable upper limit of the S content in the welding material is 0.01%.

Further, the chemical compositions of the base material and welding material in the present embodiment satisfy Equation (1) provided below.

$$Ni+0.65Cr+0.98Mo+1.05Mn+0.35Si+12.6C \geq 29 \qquad (1)$$

Here, the contents of elements (in mass %) are substituted for the symbols of these elements in Equation (1).

If the austenitic phase is stable in a hydrogen environment, good hydrogen embrittlement resistance is present. The weld metal is a microstructure produced by solidification by rapid cooling, and thus the austenitic phase tends to be unstable. As discussed above, the weld metal is formed by a part of the base material and the welding material melting together and solidifying. If the chemical compositions of both the base material and welding material satisfy Equation (1), the austenitic phase is also stable in the weld metal. This increases the hydrogen embrittlement resistance of the welded joint.

The value of the left side of Equation (1) is preferably 32 or higher, and more preferably 34 or higher.

The chemical composition of the welding material in the present embodiment further satisfies Equation (2) provided below.

$$0.31C+0.048Si-0.02Mn-0.056Cr+0.007Ni-0.013Mo \leq -1.0 \qquad (2)$$

Here, the contents of elements (in mass %) are substituted for the symbols of these elements in Equation (2).

The welding material melts during welding to form a weld metal. At this moment, N may be separated from the weld metal. If N is separated from the weld metal, the effect of solute strengthening cannot be provided, which decreases the strength of the weld metal. If the chemical composition of the welding material satisfies Equation (2), the activity of N is low, which prevents N from being separated from the weld metal. Thus, a large amount of N can be dissolved in the weld metal even if the N content in the welding material is lower than 0.15%.

The lower the value of the left side of Equation (2), the better. The lower the value of the left side of Equation (2), the smaller the surface excess weld metal height, described below, is allowed to be. The value of the left side of Equation (2) is preferably −1.1 or lower, and more preferably −1.3 or lower.

Preferably, the welded joint in the present embodiment has a surface excess weld metal height h (mm) that satisfies Equation (3) provided below.

$$1.9 \times (0.31C+0.048Si-0.02Mn-0.056Cr+0.007Ni-0.013Mo)+3 \leq h \qquad (3)$$

Here, the contents of the elements in the welding material (in mass %) are substituted for the symbols of these elements in Equation (3).

When the value of the left side of Equation (2) is P2, Equation (3) may be expressed as provided below. That is, Equation (3) indicates that the surface excess weld metal height h is adjusted depending on the activity of N in the welding material.

$$1.9 \times P2+3 \leq h$$

Surface excess weld metal height means the distance (mm) between the surface of the base material and the uppermost position of the weld bead. If the surface excess weld metal height h of the welded joint satisfies Equation (3), the welded joint has increased tensile strength. More specifically, the welded joint has a tensile strength substantially equal to that of the base material.

[Manufacturing Method]

First, an example method of manufacturing the base material will be described. A steel having the chemical composition for the base material described above is smelted. The smelting may be performed by an electric furnace, an Ar—$O_2$ mixture bottom-blown decarburizing furnace (AOD furnace), or a vacuum decarburizing furnace (VOD furnace). The smelted steel is used to produce an ingot by the ingot-making method. Alternatively, the smelted steel may be used to produce a slab by continuous casting.

The ingot or slab is used to produce a base material. The base material may be a steel plate or steel pipe, for example. The steel plate may be produced by subjecting the ingot or slab to hot working such as hot forging or hot rolling, for example. The steel pipe may be produced by, for example, subjecting the ingot or slab to hot working to produce a round billet, and subjecting the round billet to hot working such as piercing-rolling, hot extrusion or hot forging. Alternatively, the steel pipe may be produced by bending a steel plate to form an open pipe and welding those edges of the open pipe that extend in the longitudinal direction.

Heat treatment is performed on the base material. More specifically, The base material is placed in a heat treatment furnace and soaked at 1000 to 1200° C. Thereafter, as necessary, cold rolling and a secondary heat treatment at 800 to 1200° C. are performed. Thus, a base material having a tensile strength of 800 MPa can be provided in a stable manner.

Next, an example method of manufacturing the welding material will be described. A steel having the chemical composition for the welding material described above is smelted. The smelted steel is cast into an ingot. The ingot is hot-worked to produce a welding material. The welding material may be in the shape of a rod or block.

Heat treatment is performed on the welding material in a similar manner to that for the base material. Thereafter, as necessary, cold rolling and a secondary heat treatment at 800 to 1250° C. are performed.

The welding material described above is used to weld the base material described above. This provides a welded joint. The welding method may be, for example, TIG welding, MIG welding, MAG welding, or submerge welding. During welding, a part of the base material and the welding material melt together and solidify to form a weld metal.

EXAMPLES

The present invention will be described in more detail using Examples. The present invention is not limited to these Examples.

A steel labeled with character A having the chemical composition shown in Table 1 was melted in a laboratory to produce an ingot. The ingot was subjected to hot forging, hot rolling and heat treatment to produce a steel pipe (base material) with an outer diameter of 9.53 mm, a plate thickness of 2.2 mm and a length of 60 mm.

TABLE 1

| | Chemical composition (in mass %, balance Fe and impurities) | | | | | | | | | | | | |
|---|---|---|---|---|---|---|---|---|---|---|---|---|---|
| Character | C | Si | Mn | P | S | Ni | Cr | Mo | V | Nb | Al | N | O |
| A | 0.03 | 0.40 | 4.40 | 0.017 | 0.002 | 12.0 | 22.0 | 2.1 | 0.20 | 0.20 | <0.001 | 0.30 | 0.015 |

If the chemical composition of the base material is substituted into Equation (1), the value of the left side of Equation (1) is 34, which satisfies Equation (1).

Steels labeled with characters O to Z having the chemical compositions shown in Table 2 were melted in a laboratory to produce ingots. "—" in Table 2 indicates that the content of the associated element is at an impurity level. The ingots were subjected to hot forging, hot rolling, primary heat treatment, cold treatment and secondary heat treatment to produce weld wires with an outer diameter of 1.2 mm (welding materials)

TABLE 2

| | Chemical composition (in mass %, balance Fe and impurities) | | | | | | | | | | | | |
|---|---|---|---|---|---|---|---|---|---|---|---|---|---|
| Character | C | Si | Mn | P | S | Ni | Cr | Mo | V | Nb | Al | N | O |
| O | 0.098 | 0.42 | 2.29 | 0.001 | 0.002 | 12.5 | 24.3 | 2.79 | 0.10 | 0.1 | 0.004 | 0.10 | 0.011 |
| P | 0.096 | 0.42 | 2.28 | 0.001 | 0.002 | 12.5 | 24.3 | 2.78 | — | 0.1 | 0.003 | 0.14 | 0.011 |
| Q | 0.097 | 0.08 | 2.42 | 0.001 | 0.002 | 12.2 | 24.6 | 2.94 | 0.23 | 0.1 | 0.004 | 0.10 | 0.012 |
| R | 0.099 | 0.45 | 2.34 | 0.008 | 0.001 | 13.5 | 24.4 | 2.22 | — | — | 0.002 | 0.05 | 0.006 |
| S | 0.019 | 0.52 | 1.52 | 0.020 | 0.001 | 20.5 | 23.1 | 2.16 | 0.10 | — | 0.001 | 0.08 | 0.006 |
| T | 0.028 | 0.20 | 0.75 | 0.010 | 0.001 | 8.9 | 20.5 | 0.01 | — | — | 0.002 | 0.10 | 0.006 |
| U | 0.009 | 0.46 | 2.26 | 0.014 | 0.001 | 13.5 | 19.0 | 3.84 | — | — | 0.003 | 0.05 | 0.006 |
| V* | 0.008 | 0.30 | 1.21 | 0.001 | 0.002 | 12.3 | 23.6 | 2.25 | — | — | 0.003 | 0.19 | 0.007 |
| W* | 0.009 | 0.39 | 2.02 | 0.002 | 0.002 | 11.1 | 22.2 | 2.21 | — | — | 0.003 | 0.33 | 0.007 |
| X* | 0.005 | 1.10 | 2.18 | 0.002 | 0.002 | 8.1 | 26.7 | — | — | — | 0.004 | 0.10 | 0.006 |
| Y* | 0.100 | 0.70 | 2.25 | 0.014 | 0.002 | 18.8 | 19.0 | 3.82 | — | — | 0.004 | 0.11 | 0.006 |
| Z* | 0.005 | 0.23 | 1.49 | 0.002 | 0.002 | 22.2 | 17.3 | 2.15 | — | — | 0.004 | 0.13 | 0.006 |

Circumferential edge preparation was performed on the steel pipe described above and, thereafter, the base material and welding materials were combined as shown in Table 3 to produce welded joints with different surface excess weld metal heights. The welded joints were produced with different welding heat inputs, welding-pass numbers and welding directions. The rate at which a welding material was fed was varied depending on the welding heat input.

TABLE 3

| Test character | Base material | Welding material | Welding heat input [kJ/cm] | Welding direction | Welding-pass number |
|---|---|---|---|---|---|
| J1 | A | O | 15.0-65.0 | horizontal | 1 |
| J2 | A | O | 3.2-8.0 | | 2 |
| J3 | A | O | 3.2-8.0 | | 2 |
| J4 | A | O | 3.2-8.0 | | 2 |
| J5 | A | P | 15.0-65.0 | | 1 |
| J6 | A | P | 3.2-8.0 | | 2 |
| J7 | A | P | 3.2-8.0 | | 2 |
| J8 | A | P | 3.2-8.0 | | 2 |
| J9 | A | Q | 15.0-65.0 | | 1 |
| J10 | A | Q | 3.2-8.0 | | 2 |
| J11 | A | Q | 3.2-8.0 | | 2 |
| J12 | A | Q | 3.2-8.0 | | 2 |
| J13 | A | R | 42.0-65.0 | | 1 |
| J14 | A | R | 3.2-8.0 | | 2 |
| J15 | A | R | 3.2-8.0 | | 2 |
| J16 | A | S | 42.0-65.0 | | 1 |
| J17 | A | S | 3.2-8.0 | | 2 |
| J18 | A | S | 3.2-8.0 | | 2 |
| J19 | A | T | 42.0-65.0 | | 1 |
| J20 | A | T | 3.2-8.0 | | 2 |
| J21 | A | T | 3.2-8.0 | | 2 |
| J22 | A | U | 42.0-65.0 | | 1 |
| J23 | A | U | 3.2-8.0 | | 2 |
| J24 | A | U | 3.2-8.0 | | 2 |
| J25 | A | V* | 15.0-65.0 | | 1 |
| J26 | A | W* | 15.0-65.0 | | 1 |
| J27 | A | W* | 3.2-8.0 | | 2 |
| J28 | A | X* | 3.2-8.0 | | 2 |
| J29 | A | X* | 3.2-8.0 | | 2 |
| J30 | A | X* | 3.2-8.0 | | 2 |
| J31 | A | Y* | 3.2-8.0 | | 2 |
| J32 | A | Y* | 3.2-8.0 | | 2 |
| J33 | A | Z* | 3.2-8.0 | | 2 |
| J34 | A | Z* | 3.2-8.0 | | 2 |
| J35 | A | Q | 3.2-8.0 | vertical | 2 |
| J36 | A | R | 42.0-65.0 | | 1 |
| J37 | A | R | 3.2-8.0 | | 2 |
| J38 | A | W* | 15.0-65.0 | | 1 |
| J39 | A | W* | 3.2-8.0 | | 2 |

*indicates deviation from the condition required by the invention

"Horizontal" and "vertical" for welding direction indicate that welding occurred in a "flat position" and "vertical position", respectively, in compliance with JIS Z 3001. More specifically, "horizontal" means that welding occurred in a horizontal (i.e. flat) position relative to the ground. When welding occurs in a flat position, welding occurs without working against gravity, which generally means the most straightforward weld position for direction). On the other hand, "vertical" usually means that welding occurs in an upward direction relative to the ground. When welding occurs in a vertical position, welding occurs against gravity, and thus molten metal may drip, which makes the welding difficult and may cause weld defects.

The surface excess weld metal heights of the produced welded joints were measured.

From each of the produced welded joints, a test specimen including the welded portion was extracted. The cut surface of each of the extracted test specimens was polished and observed by optical microscopy to determine whether there were weld defects. The welded joints that had no weld defects such as blowholes were determined to be good.

From each of the produced welded joints, two pipe-shaped tensile test specimens each having weld metal at the center of the parallel portion were produced and subjected to tensile testing at room temperature. In the tensile testing, the welded joints that exhibited a tensile strength equal to or higher than 800 MPa were determined to be good.

From each of the produced welded joints, pipe-shaped low-strain-rate tensile test specimens each having a parallel portion made of the weld metal were extracted. The extracted test specimens were subjected to low-strain-rate tensile testing in the atmosphere and a high-pressure hydrogen environment at 85 MPa. The strain rate was $3 \times 10^{-5}$/s. In the low-strain-rate tensile testing, the welded joints in which the ratio between the reduction of area due to a break in a high-pressure hydrogen environment and the reduction of area due to a break in the atmosphere was 90% or higher were determined to be good.

Table 4 shows the presence/absence of weld defects, the measurements of the surface excess weld metal heights, the results of the room-temperature tensile tests and the results of the low-strain-rate tensile tests for the welded joints.

TABLE 4

| Test character | P1 | P2 | P3 | Weld defect | Excess weld metal height [mm] | Tensile test | Low-strain-rate tensile test |
|---|---|---|---|---|---|---|---|
| J1 | 35 | −1.3 | 0.53 | ○ | 1.2 | ◉ | ○ |
| J2 | 35 | −1.3 | 0.53 | ○ | 0.15 | Δ | ○ |
| J3 | 35 | −1.3 | 0.53 | ○ | 0.9 | ◉ | ○ |
| J4 | 35 | −1.3 | 0.53 | ○ | 1.5 | ◉ | ○ |
| J5 | 35 | −1.31 | 0.51 | ○ | 1.3 | ◉ | ○ |
| J6 | 35 | −1.31 | 0.51 | ○ | 0.12 | Δ | ○ |
| J7 | 35 | −1.31 | 0.51 | ○ | 0.78 | ◉ | ○ |
| J8 | 35 | −1.31 | 0.51 | ○ | 1.51 | ◉ | ○ |
| J9 | 35 | −1.35 | 0.44 | ○ | 1.18 | ◉ | ○ |
| J10 | 35 | −1.35 | 0.44 | ○ | 0.12 | Δ | ○ |
| J11 | 35 | −1.35 | 0.44 | ○ | 0.92 | ◉ | ○ |
| J12 | 35 | −1.35 | 0.44 | ○ | 1.5 | ◉ | ○ |
| J13 | 35 | −1.3 | 0.53 | ○ | 1.15 | ◉ | ○ |
| J14 | 35 | −1.3 | 0.53 | ○ | 0.5 | Δ | ○ |
| J15 | 35 | −1.3 | 0.53 | ○ | 1.48 | ◉ | ○ |
| J16 | 40 | −1.18 | 0.76 | ○ | 1.22 | ◉ | ○ |
| J17 | 40 | −1.18 | 0.76 | ○ | 0.57 | Δ | ○ |
| J18 | 40 | −1.18 | 0.76 | ○ | 1.45 | ◉ | ○ |
| J19 | 23 * | −1.08 | 0.95 | ○ | 1.08 | ◉ | X |
| J20 | 23 * | −1.08 | 0.95 | ○ | 0.9 | Δ | X |
| J21 | 23 * | −1.08 | 0.95 | ○ | 1.49 | ◉ | X |
| J22 | 32 | −1.04 | 1.02 | ○ | 1.17 | ◉ | ○ |
| J23 | 32 | −1.04 | 1.02 | ○ | 0.6 | Δ | ○ |
| J24 | 32 | −1.04 | 1.02 | ○ | 1.5 | ◉ | ○ |
| J25 | 31 | −1.27 | 0.59 | X | 1.11 | X | X |
| J26 | 30 | −1.21 | 0.70 | X | 1.01 | X | X |
| J27 | 30 | −1.21 | 0.70 | X | 0.55 | X | X |
| J28 | 28 * | −1.43 | 0.28 | ○ | 0.29 | ○ | X |
| J29 | 28 * | −1.43 | 0.28 | ○ | 0.65 | ◉ | X |
| J30 | 28 * | −1.43 | 0.28 | ○ | 1.65 | ◉ | X |
| J31 | 39 | −0.96 * | 1.18 | ○ | 0.56 | X | ○ |
| J32 | 39 | −0.96 * | 1.18 | ○ | 1.53 | X | ○ |
| J33 | 37 | −0.86 * | 1.37 | ○ | 0.88 | X | ○ |
| J34 | 37 | −0.86 * | 1.37 | ○ | 1.45 | X | ○ |
| J35 | 35 | −1.35 | 0.44 | ○ | 0.56 | ◉ | ○ |
| J36 | 35 | −1.3 | 0.53 | ○ | 0.95 | ◉ | ○ |
| J37 | 35 | −1.3 | 0.53 | ○ | 0.66 | ◉ | ○ |
| J38 | 30 | −1.21 | 0.70 | X | 0.97 | X | X |
| J39 | 30 | −1.21 | 0.70 | X | 0.54 | X | X |

* indicates deviation from the condition required by the invention

The column of "P1" in Table 4 lists the values of the left side of Equation (1) obtained when the chemical compositions of the welding materials of the welded joints were substituted into Equation (1). The column of "P2" lists the values of the left side of Equation (2) obtained when the chemical compositions of the welding materials of the welded joints were substituted into Equation (2). The column of "P3" lists the values of the left side of Equation (3) obtained when the chemical compositions of the welding materials of the welded joints were substituted into Equation (3).

The column of "Weld defect" in Table 4 indicates the presence or absence of weld defects. "○" indicates that there were no weld defects. "x" indicates that there were blowholes.

The column of "Excess weld metal height" in Table 4 lists the surface excess weld metal heights (mm) of the welded joints.

The column of "Tensile test" indicates the results of tensile tests. "◉" indicates that, in each of the tensile tests, both test specimens broke in the base material or broke in the heat-welded portion (i.e. HAZ break). "○" indicates that the tensile strength was 800 MPa or higher but one of the two test specimens broke in the base material and the other one broke in the weld metal. "Δ" indicates that the tensile strength was 800 MPa or higher but both test specimens broke in the weld metal. "x" indicates that the test specimens broke in the weld metal and the tensile strength was lower than 800 MPa.

The column of "Low-Strain-Rate Tensile Test" lists the results of the low-strain-rate tensile tests. "○" indicates that the ratio between the reduction of area due to a break in the high-pressure hydrogen environment and the reduction of area due to a break in the atmosphere was 90% or higher. "x" indicates that the ratio between the reduction of area due to a break in the high-pressure hydrogen environment and the reduction of area due to a break in the atmosphere was lower than 90%.

The welded joints with test characters J1 to J18, J22 to J24 and J35 to J37 were within the ranges of the present invention. More specifically, in each of these welded joints, the chemical compositions of the base material and welding material were within the ranges of the present invention, the chemical compositions of the base material and welding material satisfied Equation (1) and the chemical composition of the welding material satisfied Equation (2). As a result, each of these welded joints had a tensile strength not lower than 800 MPa and was found to be good in the low-strain-rate tensile test.

Further, these welded joints had no weld defects. Especially the welded joints with test characters J1, J5, J9, J13, J16, J22 and J36 had no weld defects even though the welding heat inputs were relatively high. The welded joints with test characters J35 to J37 had no weld defects even though the welding direction was vertical.

In addition, in each of the welded joints with test characters J1, J3 to J5, J7 to J9, J11 to J13, J15, J16, J18, J22, J24 and J35 to J37, the surface excess weld metal height h satisfied Equation (3). In other words, in each of these welded joints, the surface excess weld metal height h had a value of P3 or higher. As a result, these welded joints had particularly high tensile strengths. More specifically, these welded joints broke in the base material or experienced a HAZ break in the tensile test.

In each of the welded joints with test characters J19 to J21, the chemical compositions of the base material and welding material were in the ranges of the present invention, and the chemical composition of the base material satisfied Equation (1). However, in these welded joints, the chemical composition of the welding material did not satisfy Equation (1). As a result, these welded joints were not found to be good in the low-strain-rate tensile tests.

In each the weld joints with test characters J25 to J27, J38 and J39, the N content in the welding material (character V or W) was too high. As a result, the welded portion had weld defects, more particularly blowholes, resulting in a joint that was not good. As a result, these welded joints had a tensile strength of 800 MPa or lower.

In each of the welded joints with test characters J28 to J30, the Si content and Cr content in the welding material (character X) was too high. Further, in each of these welded joints, the chemical composition of the welding material did not satisfy Equation (1). As a result, these welded joints were not found to be good in the low-strain-rate tensile tests.

In each of the welded joints with test characters J31 to J34, the chemical composition of the welding material (character Y or Z) did not satisfy Equation (2) even though the contents of the elements were within the ranges of the present invention. As a result, these welded joints had a tensile strength of 800 MPa or lower.

INDUSTRIAL APPLICABILITY

The present invention can be suitably used in high-pressure gas piping, and more particularly, in welded joints for high-pressure hydrogen gas piping.

The invention claimed is:

1. A method of manufacturing a welded joint, comprising the steps of:
   preparing a base material having a chemical composition of, in mass %:
   C: 0.005 to 0.1%;
   Si: up to 1.2%;
   Mn: 2.5 to 6.5%;
   Ni: 8 to 15%;
   Cr: 19 to 25%;
   Mo: 0.01 to 4.5%;
   V: 0.01 to 0.5%;
   Nb: 0.01 to 0.5%;
   Al: less than 0.05%;
   N: 0.15 to 0.45%;
   O: up to 0.02%;
   P: up to 0.05%; and
   S: up to 0.04%, and
   a balance being iron and impurities,
   preparing a welding material having a chemical composition consisting of, in mass %:
   C: 0.005 to 0.1%;
   Si: up to 0.7%;
   Mn: 0.5 to 3%;
   Ni: 8 to 23%;
   Cr: 17 to 25%;
   Mo: 0.01 to 4%;
   V: 0 to 0.5%;
   Nb: 0 to 0.5%;
   Al: less than 0.05%;
   N: less than 0.15%;
   O: up to 0.02%;
   P: up to 0.03%; and
   s: up to 0.02%, and
   a balance being iron and impurities, and
   welding the base material using the welding material,
   wherein the chemical composition of the base material satisfies Equation (1), and the chemical composition of the welding material satisfies Equations (1) and (2), $$Ni+0.65Cr+0.98Mo+1.05Mn+0.35Si+12.6C \geq 29 \quad (1), \text{ and}$$

$$0.31C+0.048Si-0.02Mn-0.056Cr+0.007Ni-0.013Mo \leq -1.0 \quad (2),$$

where the contents of elements (in mass %) are substituted for the symbols of these elements in Equations (1) and (2).

2. The method of manufacturing a welded joint according to claim 1, wherein
   the step of welding includes welding the base material using the welding material such that the welded joint has a surface excess weld metal height h (mm) that satisfies Equation (3), $$1.9 \times (0.31C+0.048Si-0.02Mn-0.056Cr+0.007Ni-0.013Mo)+3 \leq h \quad (3),$$

where the contents of the elements in the welding material (in mass %) are substituted for the symbols of these elements in Equation (3).

3. The method of manufacturing a welded joint according to claim 1, wherein for Equation (2), 0.31C+0.048Si−0.02Mn−0.056Cr+0.007Ni−0.013Mo of is less than or equal to −1.3.

4. The method of manufacturing a welded joint according to claim 1, wherein
the Cr content of the welding material is 17 to 24.6 mass %.

5. The method of manufacturing a welded joint according to claim 1, wherein
the N content of the welding material is not higher than 0.13 mass %.

* * * * *